J. H. SAGER.
BUMPER FOR AUTOMOBILES.
APPLICATION FILED APR. 23, 1917.
1,251,698.
Patented Jan. 1, 1918.
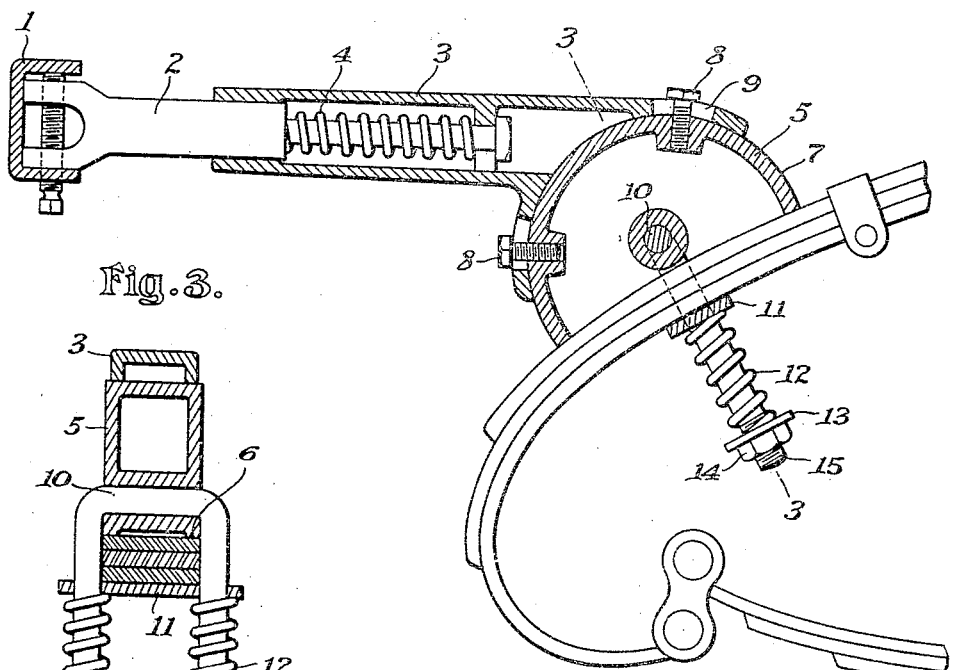
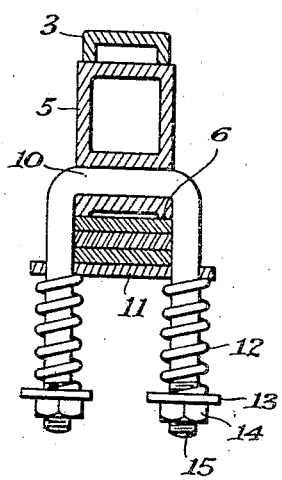
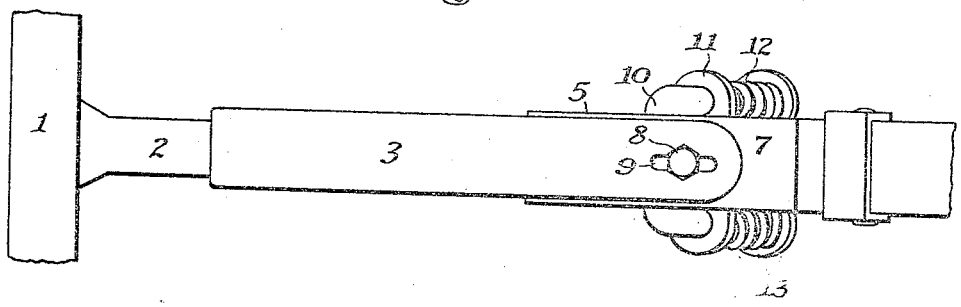
Inventor:
James H. Sager
by Davis & Simms
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION.

BUMPER FOR AUTOMOBILES.

1,251,698.

Specification of Letters Patent.

Patented Jan. 1, 1918.

Application filed April 23, 1917. Serial No. 163,993.

*To all whom it may concern:*

Be it known that I, JAMES H. SAGER, a citizen of the United States, and resident of Rochester, in the county of Monroe and State of New York, have invented certain new and useful Improvements in Bumpers for Automobiles, of which the following is a specification.

The present invention relates to bumpers for automobiles, and more particularly to the connection between said bumpers and the vehicle, an object of this invention being to provide for attaching the bumper supporting arms to the curved or elliptical leaf springs which are usually arranged at the rear of the vehicle.

To this and other ends, the invention consists of certain parts and combinations of parts all of which will be hereinafter described, the novel features being pointed out in the appended claims.

In the drawings:—

Figure 1 is a vertical section through a bumper supporting arm attached to a leaf spring;

Fig. 2 is a plan view of said arm; and

Fig. 3 is a sectional view on the line 3—3, Fig. 1.

At the present time it is customary to employ a bumper comprising a bumper bar which, in this instance, is a member 1 arranged at the front or the rear of the vehicle and supported by a pair of supporting arms. These supporting arms may be of any suitable construction, but in this instance each embodies an outer member 2 secured at its outer end to the bumper bar, an inner member 3 on which the outer member is guided for longitudinal movement, and a spring 4, or other resilient device, interposed between the two members to absorb any shocks caused by blows on the bumper bar. In this instance, the inner member 3 has a block 5 adjustably secured at its inner end and in the form of a segment of a circle with a face 6 for engaging the portion of the vehicle on which the bumper supporting arm is arranged. The inner member 3 is adjustable on the curved face 7 of the block, so as to maintain a horizontal position notwithstanding the angular adjustment of the face 6. Bolts 8, operating in slots 9, permit this adjustment, and at the same time hold the inner member 3 firmly to the block 5.

Difficulty has been met with in securing bumper supporting arms to curved or elliptical leaf springs, as the leaves, during the action of a spring, slide on each other, and if the bumper supporting arm is clamped too tightly to the spring, then the latter loses its function, and if the arm is clamped too loosely to the spring, then the sliding action of the leaves on each other, together with their tapered forms, tend to cause the bumper supporting arm to move to the lowermost portion of the curve of the spring. This difficulty is overcome in this invention by providing a clip which will resiliently clamp the bumper supporting arm to the curved portion of the leaf spring, and in this way permit the relative movement between the leaves of the spring, while at the same time producing sufficient friction to hold the bumper supporting arm in a position on the spring in which said arm is clamped. In this instance, this clip embodies a U-shaped member 10 which is passed through the block 5 near the center of the latter, and has its arms lying on opposite sides of the leaf spring. On both of these arms a bar 11 is guided, and this bar engages the under side of the leaf spring, being held in such engagement by two helical springs 12 arranged on the arms of the U-shaped member 10 below the bar 11, and acting on said bar with a resilient pressure. At the lower ends of the springs 12 are two washers 13 which are supported by nuts 14 on the screw-threaded ends 15 of the U-shaped member 10. By these nuts any desired pressure may be placed upon the springs 12 to effectively hold the bar 11 in resilient or yielding engagement with the under side of the leaf spring.

This invention permits the attachment of bumpers to the rear elliptical springs of automobiles without any danger of the bumper supporting arms working downwardly on the springs or interfering with the spring action.

What I claim as my invention and desire to secure by Letters Patent is:—

1. In combination with a curved spring formed of a plurality of overlapping leaves, and a bumper supporting arm having a portion at the inner end thereof abutting the upper curved leaf of the spring, and a clip connected to said arm and passing beneath the spring to engage the under leaf, said clip having a resilient portion which causes the clip to expand and contract with the relative movement of the leaves of the spring to maintain the bumper in its secured position on the spring.

2. In combination with a curved spring formed of a plurality of overlapping leaves, a bumper supporting arm having its inner end bearing against the upper leaf of said spring, a bar engaging the under side of said spring, and connections between the bumper supporting arm and the bar having resilient means holding the bar and the arm to the spring with resilient pressure.

3. In combination with a curved spring formed of a plurality of overlapping leaves, a bumper supporting arm engaging the upper leaf of the spring, a U-shaped device passed through the arm and lying on opposite sides of the spring, a bar arranged on the clip and engaging the under surface of the spring, and a coil spring surrounding the arms of the U-shaped member and holding the bar to the under side of the leaf spring.

JAMES H. SAGER.